A. W. FRANCE.
PISTON AND ROD PACKING.
APPLICATION FILED MAR. 17, 1909.

945,030.

Patented Jan. 4, 1910.

WITNESSES,
Howard Hanscom
Nathan C. Lombard

INVENTOR,
ADAM W. FRANCE,
BY Robt. F. Harris.
ATTY.

UNITED STATES PATENT OFFICE.

ADAM W. FRANCE, OF PHILADELPHIA, PENNSYLVANIA, ASSIGNOR TO THE FRANCE PACKING COMPANY, OF PHILADELPHIA, PENNSYLVANIA, A CORPORATION OF PENNSYLVANIA.

PISTON AND ROD PACKING.

945,030.  Specification of Letters Patent.  Patented Jan. 4, 1910.

Application filed March 17, 1909. Serial No. 483,984.

*To all whom it may concern:*

Be it known that I, ADAM W. FRANCE, a citizen of the United States, residing at Philadelphia, in the county of Philadelphia and State of Pennsylvania, have invented an Improvement in Piston and Rod Packing, of which the following description, in connection with the accompanying drawings, is a specification, like characters on the drawings representing like parts.

The invention to be hereinafter described relates to piston and rod packing and is a development from the construction of my prior patent No. 636,512, dated Nov. 7, 1899. In the said prior patent there was shown, described and claimed a metallic packing ring consisting of a plurality of relatively movable sections having inner and outer abutting faces extending at an angle to each other, so that as the piston or other rod varied in diameter these sections would move upon and relative to each other to maintain a steam or fluid-tight joint. When these sections were placed upon a rod of greater cross-sectional area than the area of the circle formed by the inside perimeter of the sections, an opening of more or less extent was formed between the shoulders at the inner ends of the abutting faces, and, in consequence, it has been usual to employ two of such packing rings in each division of the retaining case, such rings being relatively disposed so as to break joints. This character of packing ring in its various forms has been a practical success, and notwithstanding the formation of said opening in the manner stated and the use of two rings in the same compartment arranged to have such openings "break joints," its merits have been recognized and it has gone into extensive use.

The present invention aims to improve the packing ring of said patent, whereby the use of two adjoining rings in a compartment or between division flanges of the retaining case may be avoided and a tight joint be attained, and whereby the compression spring may act at all times on the entire outer perimeters or other portions of the sections to draw them together.

Other objects of the invention will appear from the following description and accompanying drawings of one form of means embodying the invention, it being understood that the invention is not restricted to the particular details shown and described, but in its true scope is definitely pointed out by the claims.

Figure 1:
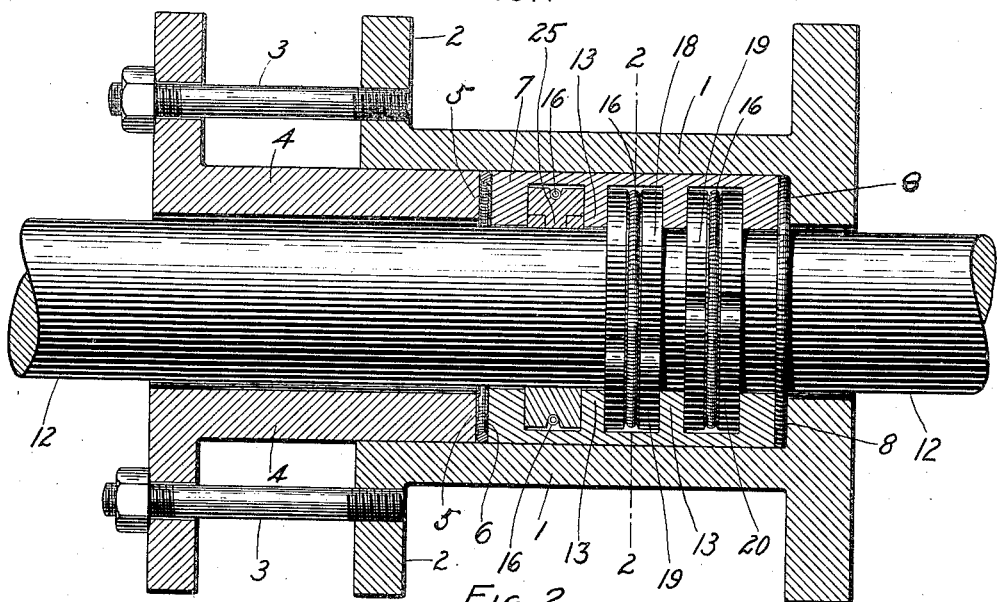
Figure 2:
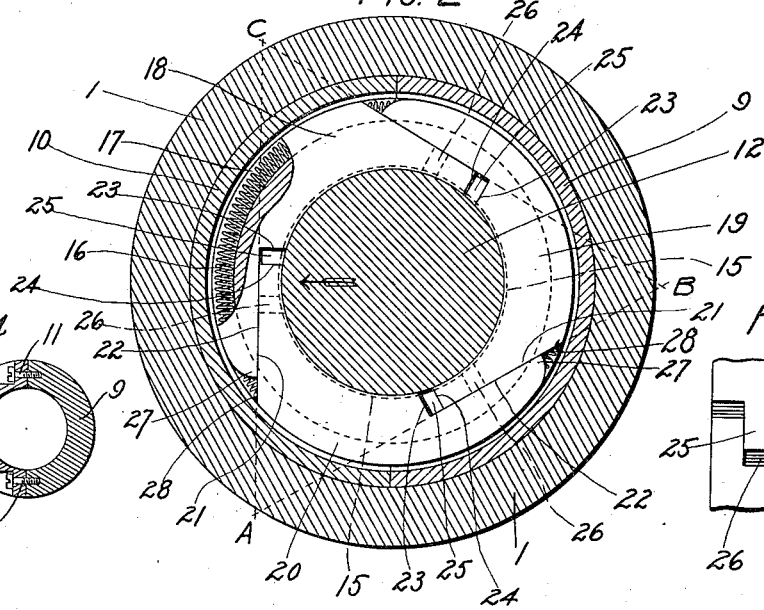
Figure 3:
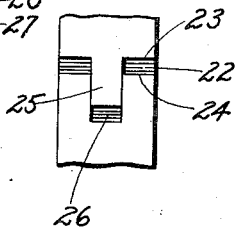

In the drawings:—Figure 1 is a longitudinal section of one simple form of stuffing box for a piston rod, showing one of the packing rings of the present invention in section, and the other two in elevation, it being understood, of course, that the number of rings employed, the character of the retaining case and parts may be varied to suit the surrounding conditions of use; Fig. 2 is an enlarged sectional view on the line 2—2, Fig. 1; Fig. 3 is a detached detail looking at the inside of one of the rings, as indicated by the arrow, Fig. 2, showing the interlocking or overlapping portions of the ring sections at the shouldered portions of the abutting faces; and Fig. 4 is a detached view, in section, of the divided case.

In the drawings, the stuffing box 1 is shown as of usual construction having a flange 2 which may be engaged by suitable screw bolts 3 for connecting and drawing up the gland 4, the inner end 5 of which preferably bears upon a gasket 6 interposed between said end 5 of the gland and the sectional case 7. The other end of said case or a part engaged therewith may also rest upon a similar gasket 8 interposed between the inner end of the stuffing box and said case or part, as clearly shown in Fig. 1, the general character of the construction being such that upon manipulation of the screw bolts or their connected nuts the gland 4 may be forced into the stuffing box to hold the sectional case 7 in desired position.

Figure 4:
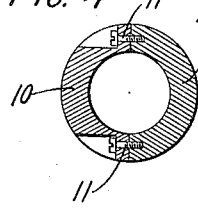

The case 7, Fig. 4, is preferably divided longitudinally, as shown, to form two halves 9, 10, joined together by screw bolts 11, such form of sectional case being convenient for ready application of the packing in some cases, and whether made in sections or not, said case may be provided with recesses forming seats for the packing rings, presently to be described. In order that scoring or binding of the piston rod 12 may not occur, it is desirable that the interior diameter of the gland 4, and of the divisional walls 13 of the case 7 be somewhat greater than the diameter of the piston rod.

The parts so far described are merely typical of a stuffing box and ring retaining case with their associated elements, and it is not to be understood that the invention is circumscribed by these details of construction, but rather that all or any of these features may be changed to suit the conditions of use or as circumstances may dictate. Mounted in each of the recesses or seats of the retaining case 7, or, in other words, disposed between each two of the separating walls or rings 13, which may be formed integral with the case 7 or otherwise, is a packing ring, the structural characteristics of which are shown in Fig. 2. Each of these packing rings is formed of a plurality of sections, as pointed out in Patent No. 636,512, the inner perimeters 15 of which are of the same radii, and their combined length is less than the circumference of a circle of the same radius, so that said sections can be caused to conform to the size of the inclosed rod 12 which they pack, by means of a spring 16 or the like, surrounding said sections and seated in a groove 17 formed therein.

The ring sections 18, 19, 20 have angularly related abutting faces upon which the adjacent sections slide relatively and which from steam joints, each section being provided with an outer abutting face 21 and an inner abutting face 22, both of which are tangential to the inner peripheries of the sections though not necessarily intersecting the same. These faces, when three are used, are formed and related as the sides of an equilateral triangle A, B, C, Fig. 2, though obviously the number of such sections and abutting faces may be increased, in which event the planes of said faces will be formed as the sides of a corresponding equilateral geometric figure, as will be readily understood.

At the inner end portion of the inner face 22 of each section is formed a shoulder 23, and at the inner end portion of the adjacent outer face 21 of the adjacent section is a shoulder 24 substantially as pointed out in my prior patent. In said prior patent, when the ring was expanded beyond its smallest dimensions, the shoulders 23 and 24 obviously separated somewhat and formed an opening between them through which steam might pass, so that two rings were associated together between the division walls 13 of the case and arranged to break joints. In the present invention, however, the ring sections have transversely extending overlapping portions which continue to close the opening between the shoulders 23 and 24 when the sections are separated, so that notwithstanding the expanded or contracted condition of a packing ring, a steam-tight joint is always presented between the ring sections, and as a consequence it is not necessary to use more than one packing ring between the division walls of the case, as will be apparent. As one form of such transversely extending overlapping portions for the ring section, the present embodiment of the invention shows each inner abutting face 22 of the sections provided with a projecting portion 25, Figs. 1, 2 and 3, extending from the shoulder 23 toward and beyond the shoulder 24 of the adjoining section, said adjoining section being provided with a suitable socket or recess to receive the portion 25 with a sliding fit. Thus it will be seen that as the packing ring expands and contracts, the transversely projecting portion or tongue 25 on one section will slide relative to and on a transversely extending portion of the adjoining section, the construction being such that the opening between the shoulders 23 and 24 that would otherwise occur remains closed so that steam or fluid cannot pass.

It will be understood that the invention is not limited to the portion 25 and recess 26 of adjoining sections interlocking, as in the form of the invention illustrated, but contemplates transversely extending overlapping portions on adjoining sections of the packing ring to close the space between the shoulders of said sections as they are separated regardless of the particulars of structure and angular relation of surfaces.

In order that the ring contracting spring 16 may act more effectively to draw or tend to draw the ring sections together rather than to have the reverse action, the present invention contemplates making the face 22 of each section from its shoulder 23 to its extreme end 27, Fig. 2, of less length than the face 21 of the adjoining section from the shoulder 24 to the perimeter of the ring at 28. By this means the spring 16 acts upon the perimeters or outer portions of the sections and acts normally to draw them toward each other whether the ring be in expanded or contracted condition; whereas, if the face 21 were shorter than face 22 adjoining it, the spring 16 would act on the outer end portion of the face 22 and tend to slide the face 22 over face 21 in a direction to expand the ring, as will be readily understood.

By the construction of packing ring herein described, it will be noted that only one such ring need be employed, and if more than one be used they may be disposed singly between the division walls of the case or between division rings. This enables the metal packing, also, to be put in a very shallow packing box, as will be obvious to those skilled in the art, and no duplication of rings is necessary to break joints.

What is claimed is:

1. A packing ring comprising three or more relatively movable sections, each of which is provided with inner and outer abutting faces, said faces being formed in planes corresponding to the sides of the same equilateral geometric figure, the contacting faces of adjoining sections having transversely disposed overlapping portions.

2. A packing ring comprising three or more relatively movable sections, each of which is provided with inner and outer abutting faces, said faces being formed in planes corresponding to the sides of the same equilateral geometric figure, the contacting faces of adjoining sections having transversely disposed overlapping portions and means normally acting to contract said sections.

3. A packing ring comprising three or more relatively movable sections, each of which is provided with inner and outer abutting faces disposed at an angle to each other, said faces being formed in planes corresponding to the sides of the same equilateral geometric figure, and terminating adjacent the inner peripheral portions of said sections with shoulders extending radially of the sections, said sections having transversely disposed overlapping portions closing the opening between the shoulders.

4. A packing ring comprising three or more relatively movable sections, each of which is provided with inner and outer abutting faces disposed at an angle to each other, said faces being formed in planes corresponding to the sides of the same equilateral geometric figure, and terminating adjacent the inner peripheral portions of said sections with radial shoulders, said sections having transversely disposed overlapping portions closing the opening between the shoulders and a spring for normally contracting said sections toward each other.

5. A packing ring comprising three or more relatively movable sections, each having an inner and an outer abutting face angularly disposed with relation to each other as the sides of the same equilateral geometric figure, the contacting inner and outer faces of adjoining sections forming steam joints, and said sections being provided with overlapping portions extending in a plane intersecting the plane of the abutting faces.

6. A packing ring comprising three or more relatively movable sections, each having an inner and an outer abutting face angularly disposed with relation to each other as the sides of the same equilateral geometric figure, the contacting inner and outer faces of adjoining sections forming steam joints, said sections being provided with overlapping portions extending in a plane intersecting the plane of the abutting faces, and a spring for normally contracting said sections.

7. A packing ring comprising three or more relatively movable sections, each having an inner and an outer abutting face angularly disposed with relation to each other and formed as the sides of the same equilateral geometric figure, the contacting inner and outer faces of adjoining sections forming steam joints, and the abutting face of one section having a projecting portion to overlap a part of the adjoining section.

8. A packing ring comprising three or more relatively movable sections, each having an inner and an outer abutting face angularly disposed with relation to each other and formed as the sides of the same equilateral geometric figure, the contacting inner and outer faces of adjoining sections forming steam joints, the abutting face of one section having a recess and the abutting face of the other section having a projecting portion to engage said recess.

9. A packing ring comprising three or more relatively movable sections, each of which is provided with angularly disposed inner and outer abutting faces, said faces being formed in planes corresponding to the sides of the same equilateral geometric figure, the length of the overlying face of one section being less than the adjacent underlying face of the adjoining section when the sections are contracted to their smallest diameter, and means acting upon the outer portions of said sections to draw them together.

10. A packing ring comprising three or more relatively movable sections, each of which is provided with angularly disposed inner and outer abutting faces, said faces being formed in planes corresponding to the sides of the same equilateral geometric figure, the length of the overlying face of one section being less than the adjacent underlying face of the adjoining section when the sections are contracted to their smallest diameter, said sections having overlapping portions disposed at an angle to said faces.

In testimony whereof, I have signed my name to this specification, in the presence of two subscribing witnesses.

ADAM W. FRANCE.

Witnesses:
ELWOOD C. WEEKS,
EDMUND C. GASKILL, Jr.